(12) United States Patent
Kato et al.

(10) Patent No.: US 8,292,312 B2
(45) Date of Patent: Oct. 23, 2012

(54) STABILIZER BUSHING FOR VEHICLE

(75) Inventors: Kazuhiko Kato, Komaki (JP); Hiroaki Nagai, Komaki (JP); Hideo Yanagino, Konan (JP); Katsuzo Okada, Kasugai (JP); Kouichi Kobayashi, Kasugai (JP); Yuji Homma, Nagoya (JP); Shinji Hayashi, Toyota (JP)

(73) Assignees: Tokai Rubber Industries, Ltd., Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/205,840

(22) Filed: Aug. 9, 2011

(65) Prior Publication Data

US 2011/0291377 A1 Dec. 1, 2011

Related U.S. Application Data

(63) Continuation of application No. PCT/JP2011/051711, filed on Jan. 28, 2011.

(30) Foreign Application Priority Data

Jan. 29, 2010 (JP) ................................. 2010-018362

(51) Int. Cl.
| | |
|---|---|
| *B60G 21/055* | (2006.01) |
| *B60G 11/22* | (2006.01) |
| *F16F 1/44* | (2006.01) |
| *F16F 1/40* | (2006.01) |
| *F16F 7/00* | (2006.01) |
| *F16F 1/16* | (2006.01) |

(52) U.S. Cl. .......... 280/124.107; 280/124.152; 267/293; 267/294; 267/141.1

(58) Field of Classification Search .................. 267/293, 267/292, 294, 141.1, 141.2, 141.3, 141.4, 267/279, 280, 281, 282; 384/220, 222, 435, 384/436; 280/124.107, 124.152
See application file for complete search history.

(56) References Cited

U.S. PATENT DOCUMENTS

| 3,007,754 | A | * | 11/1961 | Cross ............................. 384/261 |
| 4,007,924 | A | * | 2/1977 | Jorn et al. ...................... 267/282 |
| 4,667,943 | A | * | 5/1987 | Izumi et al. ................. 267/141.3 |

(Continued)

FOREIGN PATENT DOCUMENTS

GB 1516572 7/1978
(Continued)

OTHER PUBLICATIONS

U.S. Appl. No. 13/239,850 to Kazuhiko Kato et al., which was filed on Sep. 22, 2011.

*Primary Examiner* — Joseph Rocca
*Assistant Examiner* — Joselynn Y Sliteris
(74) *Attorney, Agent, or Firm* — Greenblum & Bernstein P.L.C.

(57) ABSTRACT

A stabilizer bushing is provided which effectively reduces a torsional friction between a bushing body and a stabilizer bar. The stabilizer bushing includes a bushing body 16 made of a tubular elastic body, a sliding member 42 fixed to an inner circumferential surface of the tubular elastic body, and two partition members 26, 26 embedded in and bonded to a radially middle area of the bushing body 16. The partition members 26, 26 divide the bushing body 16 into an inner rubber portion 38 that is thin enough not to be elastically-deformed by a load applied thereto and an outer rubber portion 40 that is thicker than the inner rubber portion 38. Further, each of the partition members 26, 26 includes through holes 36a, 36b, 36c that are located so as to divide the partition member into a plurality of sections both in the axial and circumferential directions.

13 Claims, 9 Drawing Sheets

U.S. PATENT DOCUMENTS

| | | | |
|---|---|---|---|
| 4,744,677 A * | 5/1988 | Tanaka et al. | 384/222 |
| 5,290,018 A | 3/1994 | Watanabe et al. | |
| 5,437,439 A * | 8/1995 | Brokamp et al. | 267/293 |
| 6,031,545 A * | 2/2000 | Ellenby et al. | 345/632 |
| 6,241,225 B1 * | 6/2001 | Krause | 267/292 |
| 6,755,405 B2 * | 6/2004 | Kammel et al. | 267/293 |
| 7,845,624 B2 * | 12/2010 | Endo et al. | 267/140.12 |
| 2006/0091595 A1 * | 5/2006 | Hayashi et al. | 267/276 |

FOREIGN PATENT DOCUMENTS

| | | |
|---|---|---|
| JP | 61-134411 | 8/1986 |
| JP | 6-40484 | 10/1994 |
| JP | 9-072365 | 3/1997 |
| JP | 2000-046110 | 2/2000 |
| JP | 2002-321516 | 11/2002 |
| JP | 2004-142586 | 5/2004 |
| JP | 2006-170257 | 6/2006 |
| JP | 2007-261538 | 10/2007 |
| JP | 2008-201307 | 9/2008 |
| JP | 2008213751 A * | 9/2008 |
| JP | 2009-255888 | 11/2009 |

* cited by examiner

STABILIZER BUSHING FOR VEHICLE

This application is a continuation of the International Application No. PCT/JP2011/051711, filed Jan. 28, 2011, which claims the benefit under 35 U.S.C. §119(a)-(d) of Japanese Application No. 2010-018362, filed Jan. 29, 2010, the entireties of which are incorporated herein by reference.

TECHNICAL FIELD

The present invention relates to a stabilizer bushing for a vehicle. More particularly, the present invention relates to an improved structure of a stabilizer bushing for a vehicle that elastically supports a stabilizer bar on a vehicle body, while the stabilizer bar is inserted into an inner bore of the stabilizer bushing without bonding to the inner bore.

BACKGROUND ART

As is well known, a stabilizer bar is mounted on a vehicle such as an automobile for the purpose of suppressing tilting of a vehicle body, which is occurred at a turn or the like of the vehicle. Generally, the stabilizer bar is mounted to the vehicle body by means of a stabilizer bushing (vibration damping bushing). The stabilizer bushing includes a bushing body that is made of a tubular elastic body having an inner bore into which a stabilizer bar is inserted and a rigid bracket that is assembled to an outer circumferential surface of the bushing body.

It is well known that the stabilizer bushing used to mount a stabilizer bar to a vehicle body has problems of reduced driving comfort of the vehicle as well as generation of noise when friction between an inner circumferential surface of the bushing body and an outer circumferential surface of the stabilizer bar is big at the time of rotation of the stabilizer bar in a torsional direction (turn around its axis) in a state where the stabilizer bar is inserted into the inner bore of the bushing body.

In view of the above, various structures of the stabilizer bushing for reducing torsional friction generated between the bushing body and the stabilizer bar have been conventionally proposed. For example, JP-U-61-134411 proposes a stabilizer bushing having a structure in which a sliding member is fixed to an inner circumferential surface of a bushing body made of a tubular elastic body. The sliding member is composed of a liner cloth that is made of a cloth member including fluororesin fiber as a main component, for example. The stabilizer bushing having such a structure can lower the friction coefficient of the inner circumferential surface of the bushing body because of the presence of the sliding member. As a result, the torsional friction between the inner circumferential surface of the bushing body and the outer circumferential surface of the stabilizer bar can effectively be reduced.

Further, in the conventional stabilizer bushing, two partition members each having a semi-tubular shape are embedded in a middle area in a radial direction of the bushing body so as to divide the bushing body into an inner rubber portion, which is positioned at an inner side, and an outer rubber portion, which is positioned at an outer side, of the radially middle area of the bushing body. These two partition members are disposed in such a way that they correspond to each other in a longitudinal direction of the vehicle in a state where the stabilizer bar is inserted into the bushing body. Accordingly, in the conventional stabilizer bushing, the load applied to the bushing body by the relative displacement of the stabilizer bar in the longitudinal direction of the vehicle is dispersed by each of the partition members. Thus, excessive deformation of a part of the bushing body and permanent set, for example, due to the stress concentration, can be prevented.

However, the following problems are inherent in the conventional stabilizer bushing having the above structure.

Generally, in the conventional stabilizer bushing, the inner rubber portion is made to have a thin thickness such that the outer rubber portion has a big volume to the maximum extent possible, so that the damping characteristics against the load applied from the outside can be exhibited mainly at the outer rubber portion of the bushing body. Therefore, when the bushing body of such a stabilizer bushing is formed by vulcanization, unvulcanized rubber flow to both edges in a circumferential direction and both edges in an axial direction of each of the partition members, from a cavity section for molding an outer rubber portion, to enter the inside of a cavity section for molding an inner rubber portion having a small width, and then, the unvulcanized rubber flow a relatively long distance under a big flow resistance in the cavity section having a small width. Thus, the unvulcanized rubber does not perfectly fill the cavity section for molding an inner rubber portion, so that the thickness of the inner rubber portion may be varied.

In such a stabilizer bushing, when the sliding member is composed of a liner cloth having a surface lubricity, the liner cloth is generally fixed to the inner rubber portion at the time of vulcanization molding of the bushing body. Therefore, in the vulcanization molding of the bushing body of the stabilizer bushing, the following deficiencies may be occurred due to the flow pressure of the unvulcanized rubber that flow in the cavity section for molding an inner rubber portion which has a small width, under big flow resistance. Specifically, the liner cloth may be fixed to the inner rubber portion in a state where the liner cloth is partially undulated or rumpled, or a part of the unvulcanized rubber may be oozed from the inner circumferential surface of the liner cloth to form a rubber film thereon. If the above deficiencies are occurred, the sliding properties against the stabilizer bar are varied in the circumferential direction of the liner cloth. As a result, smooth rotation of the stabilizer bar in the torsional direction may be inhibited.

Further, in the conventional stabilizer bushing, the two partition members are disposed at the radially middle area of the bushing body such that they correspond to each other in the longitudinal direction of the vehicle, but no partition members are provided such that they correspond to each other in the vertical direction of the bushing body. Thus, in the case where the sliding member of the stabilizer bushing is composed of the liner cloth, both of the outer rubber portion and the inner rubber portion of the bushing body are elastically-deformed when the load in the vertical direction is applied to the stabilizer bushing in a state where the stabilizer bushing is mounted on the vehicle, whereby the liner cloth fixed to the inner circumferential surface of the inner rubber portion may be deformed or rumpled. Therefore, in such a case, the sliding properties against the stabilizer bar are also varied in the circumferential direction of the liner cloth. As a result, smooth rotation of the stabilizer bar in the torsional direction may be inhibited.

SUMMARY OF THE INVENTION

The present invention has been made in the light of the situation described above. It is therefore an object of the invention to provide a stabilizer bushing that is improved to advantageously obtain a structure in which smooth rotation of a stabilizer bar inserted into an inner bore of a bushing body without being bonded to the inner bore can always stably be secured, regardless of structure and kind of a sliding member fixed to an inner circumferential surface of the bushing body, thereby effectively reducing torsional friction between the inner circumferential surface of the bushing body and an outer circumferential surface of the stabilizer bar, and in which the thickness of an inner rubber portion which is positioned at an inner side of the partition member is equal in a circumferential direction.

To achieve the aforementioned object, or to solve the problems understood from description throughout the present specification and drawings, the present invention may preferably be embodied according to various aspects which will be described below. Each aspect described below may be employed in any combination. It is to be understood that the aspects and technical features of the present invention are not limited to those described below, and can be recognized based on the inventive concept disclosed in the whole specification and drawings.

It is an object of the present invention to provide a stabilizer bushing for a vehicle comprising: (a) a bushing body made of a tubular elastic body having an inner bore that extends therethrough in an axial direction thereof and into which a stabilizer bar is inserted without bonding thereto, the bushing body being mounted to a vehicle body by means of a bracket that is assembled to an outer circumferential surface of the bushing body; (b) two partition members embedded in a middle area in a radial direction of the bushing body and bonded thereto by vulcanization in such a way that each of the two partition members divides the bushing body into an inner rubber portion and an outer rubber portion, each of the two partition members being rigid and having a semi-tubular shape; and (c) a sliding member fixed to an inner circumferential surface of the inner bore, the sliding member being slidably contacted with the stabilizer bar inserted into the inner bore, wherein the inner rubber portion has a thickness that is smaller than the outer rubber portion and that is not elastically-deformed by a load applied thereto, wherein the two partition members are embedded in the bushing body such that the two partition members correspond to each other in the vertical direction in a state where the stabilizer bar is inserted into the inner bore of the bushing body, wherein each of the two partition members includes, at both axial end portions thereof, a projection that projects in an axially outward direction from both axial end surfaces of the bushing body, wherein the projection includes an outer flange extending in the radially outward direction of the partition member, the outer flange being integrally formed at both end portions in the circumferential direction located on both axial end portions of each of the two partition members, and wherein each of the two partition members includes at least one through hole which is located at least one position that divides each of the two partition members equally in the circumferential direction and the axial direction and which allows unvulcanized rubber to pass therethrough at the time of injection molding of the elastic body.

The expression "thickness that is not elastically-deformed" includes not only the thickness that is not deformed, but also the thickness that is deformed a little but the amount of the elastic deformation is not enough to secure the effective damping characteristics or difficult to secure the effective damping characteristics. The expressions "the position that divides the partition member equally in the circumferential direction" and "the position that divides the partition member equally in the axial direction" include not only the position that divides the partition member exactly equally in the circumferential direction and the axial direction, but also the position that divides the partition member almost equally, but slightly variedly in the circumferential direction and the axial direction (for example, due to subtle difference caused by design error and the like). Further, "the axial direction of the partition member" means the extending direction of the semi-tubular shape of the partition member. Hereinafter, those expressions are used in the above meanings.

According to a preferable aspect of the present invention, the maximum thickness of the inner rubber portion of the bushing body is smaller than the half of the maximum thickness of the outer rubber portion.

According to an advantageous aspect of the present invention, the sliding member is composed of a liner cloth having a surface lubricity.

According to a favorable aspect of the present invention, the bushing body includes at least one rubber protrusion integrally formed on at least one of the axial end surfaces of the bushing body, the at least one rubber protrusion protruding in the axially outward direction with a height higher than the projected height of the projection from both the axial end surfaces of the bushing body.

According to another advantageous aspect of the present invention, each of the outer flanges includes an exposed portion that protrudes in the radially outward direction of the bushing body and is exposed to an outside from either axial end surface of the bushing body.

According to another favorable aspect of the present invention, the at least one through hole is located only in a center portion in the circumferential direction of each of the two partition members so as to divide the partition member into a plurality of sections in the axial direction.

According to another preferable aspect of the present invention, the at least one through hole comprises a plurality of through holes, the plurality of through holes are located only at positions that equally divide each of the two partition members into three sections in the circumferential direction and a plurality of sections in the axial direction.

According to a further another favorable aspect of the present invention, each of the two partition members has an arc shaped cross section that is taken along a plane perpendicular to the axis, the arc being shorter than a semi-circle.

According to a further another advantageous aspect of the present invention, a part of the outer circumferential surface of the bushing body is made as a flat surface part extending in the axial direction, the flat surface part being positioned at one of an upper side and a lower side in a state where the stabilizer bar is inserted into the inner bore of the bushing body, and the bracket is bonded to the flat surface part by vulcanization.

According to another further favorable aspect of the present invention, the bushing body includes a split extending from the outer circumferential surface of the bushing body to the inner bore at a position between corresponding end surfaces in the circumferential direction of the two partition members such that the split extends over the entire length in the axial direction.

According to another further preferable aspect of the present invention, the bushing body is constituted by an assembled tubular elastic body that is obtained by integrating two divided elastic bodies each having a semi-tubular shape and including a divided surface extending in the axial direction, and the bracket includes an encircling portion that encircles the entire surface of an outer circumferential surface of one of the two divided elastic bodies except the divided surface, and the bracket is bonded to the one of the two divided elastic bodies by vulcanization in a state where the encircling portion of the bracket encircles the one of the two divided elastic bodies.

In the stabilizer bushing for a vehicle of the present invention, the two partition members each having a semi-tubular shape are embedded at a middle area in the axial direction of the bushing body so as to correspond to each other in the vertical direction and the thin inner rubber portion is made so as not to be subjected to elastic deformation against an applied load, especially a load applied in the direction perpendicular to the axis. Thus, the inner rubber portion is not elastically deformed when the load in the vertical direction is applied to the bushing body in a state where the stabilizer bushing is mounted on the vehicle. As a result, even if the sliding member fixed to the inner circumferential surface of the inner rubber portion (inner bore) is a liner cloth that is made of a cloth having a surface lubricity, it is effectively prevented that the liner cloth is undulated or rumpled by the elastic deformation of the inner rubber portion. Consequently, unlike the conventional stabilizer bushing, when the load in the vertical direction of the bushing body is applied, the sliding properties against the stabilizer bar may not be varied in the circumferential direction of the sliding member composed of the liner cloth, thereby always stably securing the smooth rotation of the stabilizer bar in the torsional direction.

In the stabilizer bushing for a vehicle of the present invention, each of the partition members includes at least one through hole that allows unvulcanized rubber to be passed. The at least one through hole is located so as to divide the partition member equally into a plurality of sections in the circumferential direction and the axial direction. Accordingly, for example, when the bushing body is formed by vulcanization by the injection molding, a part of the unvulcanized rubber to be filled in a cavity section for molding an inner rubber portion (hereinafter, referred to as an inner cavity section) flows into the inner cavity section from a cavity section for molding an outer rubber portion (hereinafter, referred to as an outer cavity section) after flowing to both edges in the circumferential direction and the axial direction of each of the partition members. Further, another part of the unvulcanized rubber flows into the inner cavity section from the outer cavity section through the at least one through hole provided in each of the partition members. At this time, the flow of the unvulcanized rubber in the inner cavity section is different from the case where the bushing body of the conventional stabilizer bushing is integrally formed by vulcanization.

Compared to the case where all of the unvulcanized rubber to be filled in the inner cavity section flows into the inner cavity section after flowing to both edges in the circumferential direction and both edges in the axial direction of the partition member, the flow distance of the unvulcanized rubber in the circumferential direction and the axial direction in the inner cavity section is made small in the present invention. Further, the flow distance of a part of the unvulcanized rubber in the circumferential direction and the axial direction, which is flowed into the inner cavity section after flowing to both the edge portions, and the flow distance of another part of the unvulcanized rubber in the circumferential direction and the axial direction, which is flowed into the inner cavity section through the through holes of both the partition members, are made to be the same.

Therefore, in the stabilizer bushing for a vehicle of the present invention, it can effectively be prevented that, at the time of the vulcanization molding of the bushing body, the unvulcanized rubber does not partly fill the inner cavity section that results in the variation in the thickness of the inner rubber portion. Further, when the sliding member is composed of the liner cloth made of cloth (fabric), the pressure applied to the sliding member based on the flow pressure of the unvulcanized rubber flowing in the inner cavity section can be advantageously reduced and effectively equalized on the whole of the outer circumferential surface of the sliding member, at the time of the vulcanization molding of the bushing body. Consequently, in spite of that the width of the inner cavity section is small because of the small thickness of the inner rubber portion, it can effectively be prevented that the sliding member is fixed to the inner rubber portion while being partially undulated or rumpled by the flow pressure of the unvulcanized rubber, and that a rubber film is formed on an inner rubber portion by a part of the unvulcanized rubber oozed from the inner circumferential surface of the sliding member, at the time of the formation of the bushing body by vulcanization. As a result, there is no risk of variation in the sliding properties against the stabilizer bar in the circumferential direction of the sliding member, which is caused by undulation or rumple of the sliding member or a rubber film or the like on the inner circumferential surface of the sliding member, whereby the smooth rotation of the stabilizer bar in the torsional direction can always be secured.

Thus, in the stabilizer bushing for a vehicle of the present invention, the thickness of the inner rubber portion positioned at the inner side of the partition member is made equal in the circumferential direction, thereby stably fixing the sliding member to the inner rubber portion and securing excellent damping characteristics. Further, regardless of the structure of the sliding member fixed to the inner circumferential surface of the inner bore of the bushing body, the torsional friction between the inner circumferential surface of the bushing body and the outer circumferential surface of the stabilizer bar can effectively and stably be reduced. Consequently, the generation of noise caused by the rotation of the stabilizer bar in the torsional direction can effectively be prevented and excellent driving comfort of the vehicle can effectively be secured.

In the stabilizer bushing for a vehicle of the present invention, the two partition members are embedded into the middle area in the axial direction of the bushing body, thereby preventing the elastic deformation of the inner rubber portion against the load applied in the direction perpendicular to the axis. Thus, hysteresis in load-deflection properties of the spring of the bushing body as a whole can effectively be lowered. As a result, steering stability of the vehicle on which the stabilizer bushing of the present invention is mounted can effectively be improved.

BRIEF DESCRIPTION OF DRAWINGS

FIG. 7 is a cross sectional view taken along the line D-D in FIG. 8.

DETAILED DESCRIPTION OF THE INVENTION

To further clarify the present invention, there will be described in detail an embodiment of the invention with reference to the accompanying drawing.

Figure 1:
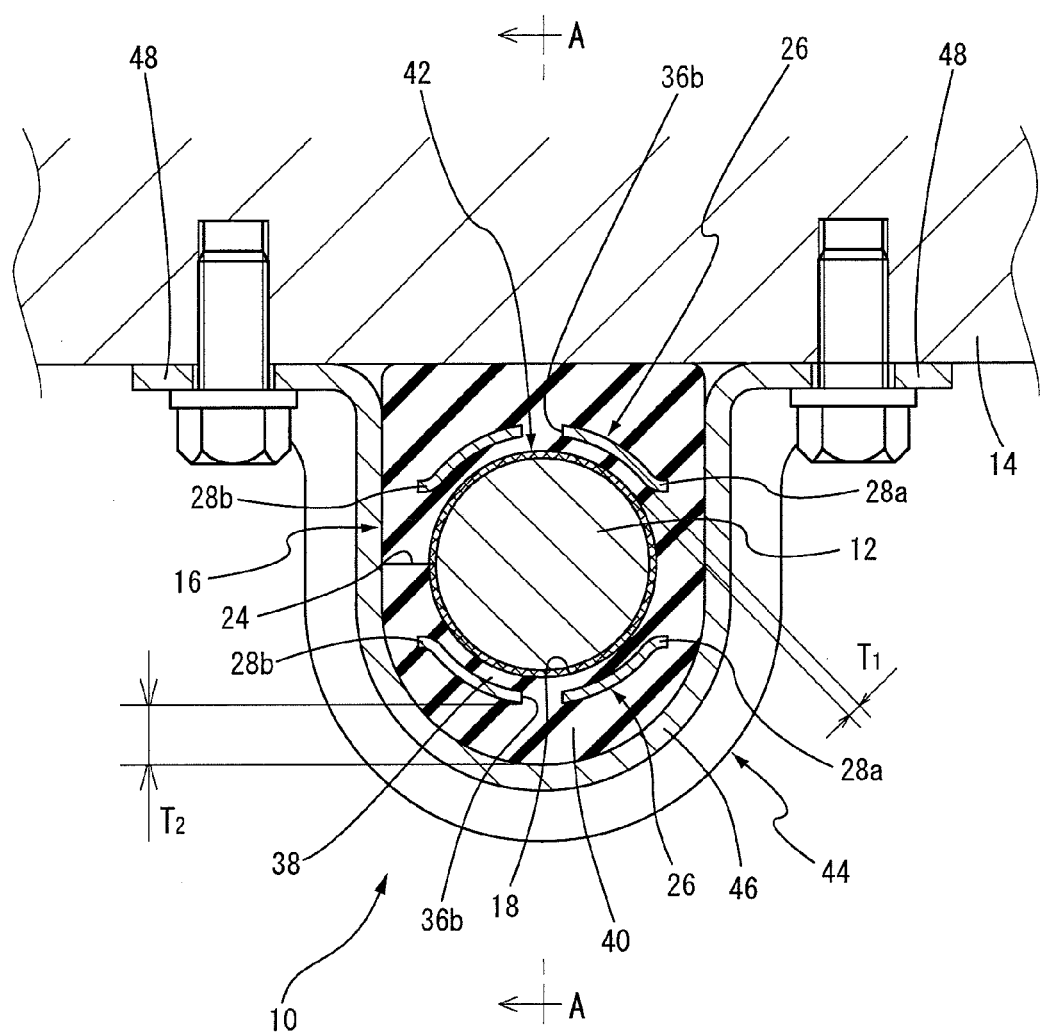
FIG. 1 is a cross sectional view taken along the line perpendicular to the axis and showing one embodiment of a stabilizer bushing having a structure of the present invention in a state where the stabilizer bar is inserted into the inner bore of the bushing body and the stabilizer bushing is mounted on the vehicle body.
Figure 2:
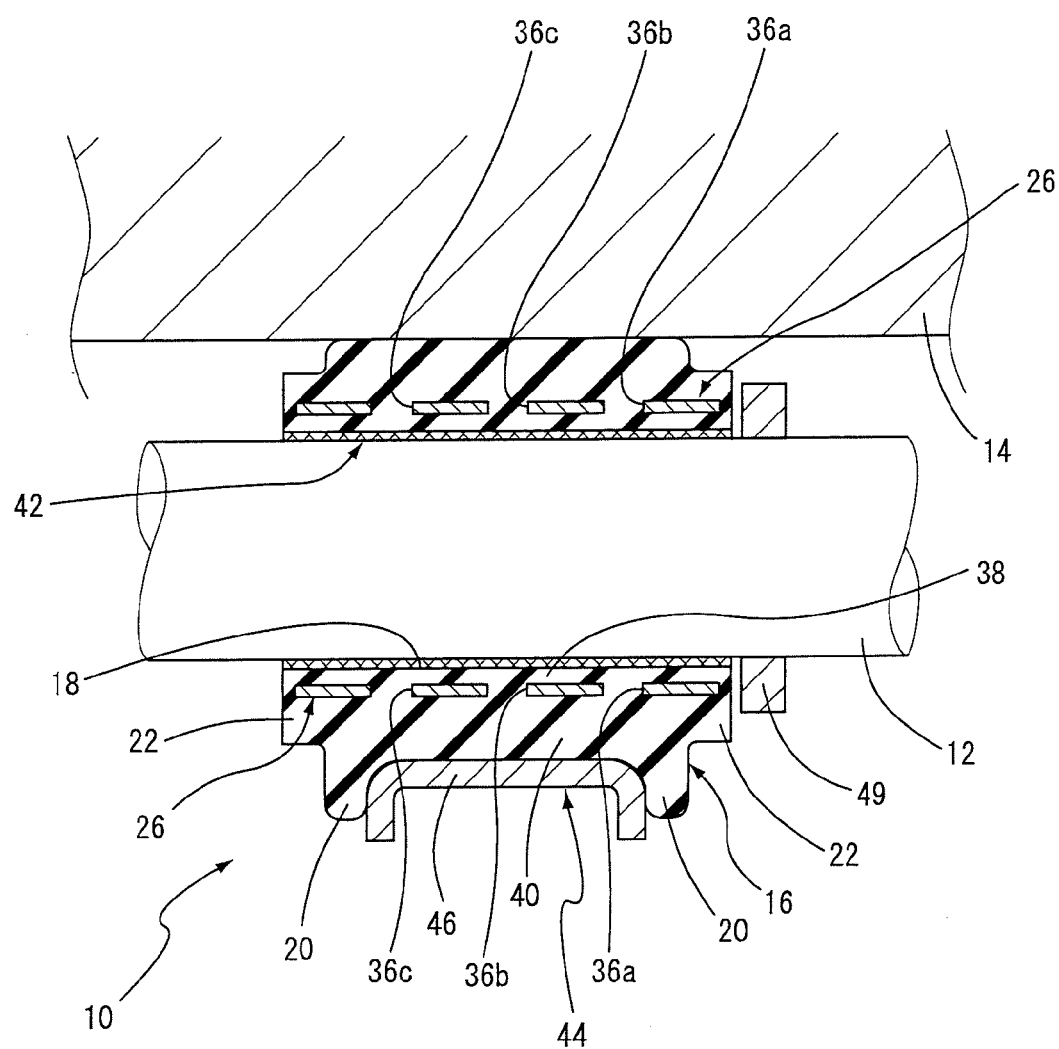
FIG. 2 is a cross sectional explanation view taken along the line A-A in FIG. 1.

Referring to FIG. 1 and FIG. 2, a stabilizer bushing for an automobile is shown as one embodiment of a stabilizer bushing for a vehicle of the present invention in a cross sectional view taken along the line perpendicular to the axis and in an axial cross sectional view, respectively. As apparent from FIG. 1 and FIG. 2, a stabilizer bushing 10 is assembled to a stabilizer bar 12 of the automobile and elastically supports the stabilizer bar 12 on a body 14 of the automobile. The stabilizer bushing 10 includes a bushing body 16 made of an elastic body.

Figure 3:
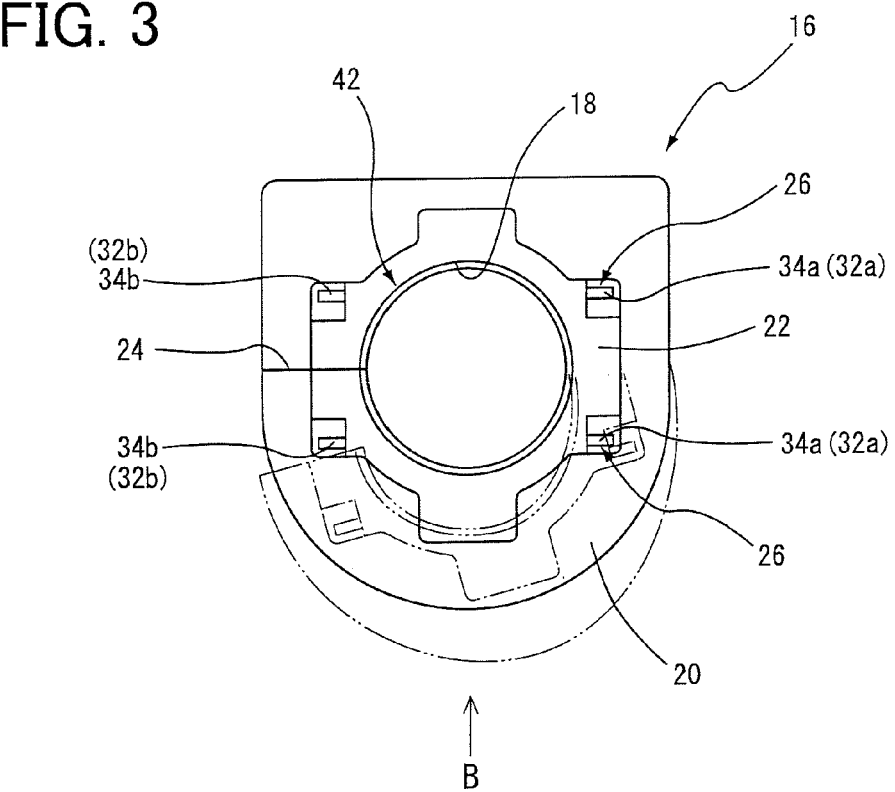
FIG. 3 is a front explanation view of the bushing body included in the stabilizer bushing shown in FIG. 1.
Figure 4:
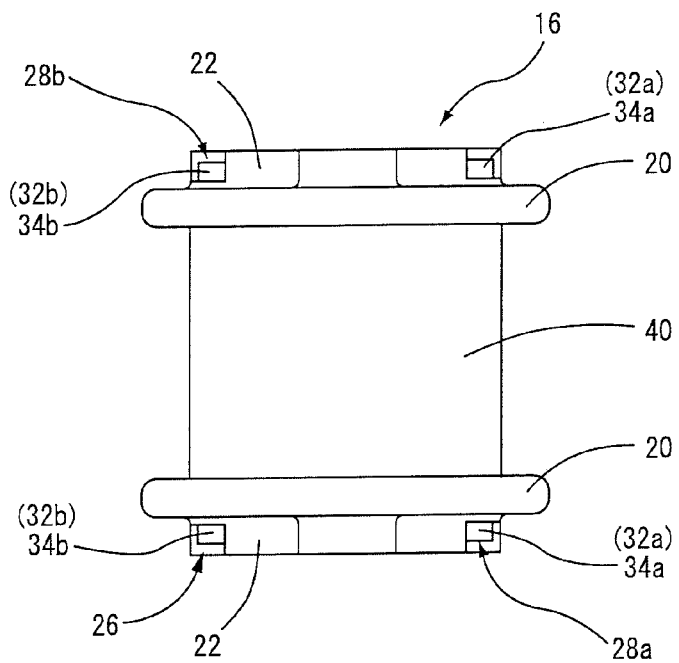
FIG. 4 is an explanation view viewed from a direction of arrow B in FIG. 3.

More specifically described, the bushing body 16 is a tubular member as a whole having an inner bore 18 extending in the axial direction as shown in FIG. 3 and FIG. 4. The bushing body has an outer circumferential surface consisting of a substantially semi-cylindrical surface and rectangular plane surfaces. Specifically, an outer circumferential portion positioned at the lower side in FIG. 3 (hereinafter, referred to as a lower surface) is the substantially semi-cylindrical surface, and two outer circumferential portions that are positioned at the right and left sides in FIG. 3 (hereinafter, referred to as side surfaces) and a part of the outer circumferential surface that is positioned at the upper side in FIG. 3 (hereinafter, referred to as an upper surface) are each rectangular plane surfaces.

On a part of both end portions in the axial direction of the bushing body 16, except the upper surface, ridges 20, 20 having a relatively large thickness are integrally provided in the circumferential direction, such that side surfaces thereof are opposed to each other. Each of the ridges 20, 20 is in a form of a plate having a substantially inverted U shape. Further, at each end surface in the axial direction of the bushing body 16, a rubber protrusion 22 protruding in an axially outward direction is integrally formed. The rubber protrusion 22 has an annular plate shape extending in the circumferential direction of an opening at the vicinity of each of the openings of the inner bore 18 opening at the axial end surfaces of the bushing body 16. The rubber protrusion 22 has a width that allows the entire outer circumference of the respective end surfaces to have a section that does not include any rubber protrusion 22. Further, the rubber protrusion 22 has four wider sections that are equally spaced apart in the circumferential direction.

At a position of the circumference of the bushing body 16, specifically, at the middle in a height direction (vertical direction in FIG. 3) of one side surface of the two side surfaces of the bushing body 16, a split 24 extending to the inner bore 18 is formed so as to extend over the entire length in the axial direction of the bushing body 16. By the split 24, the rubber protrusions 22, 22 each integrally formed on the both side surfaces in the axial direction of the bushing body 16 are split at one place of the circumference. As a result, as indicated by a two-dotted chain line in FIG. 3, the bushing body 16 is allowed to be turned on the portion opposite to the formation portion of the split 24 in such a way that the inner bore 18 is open laterally.

As apparent from FIG. 1 to FIG. 4, the two partition members 26, 26 are embedded in the bushing body 16. The two partition members 26, 26 have the same size and shape. Here, the two partition members 26, 26 are bonded to the bushing body 16 by vulcanization.

Figure 5:
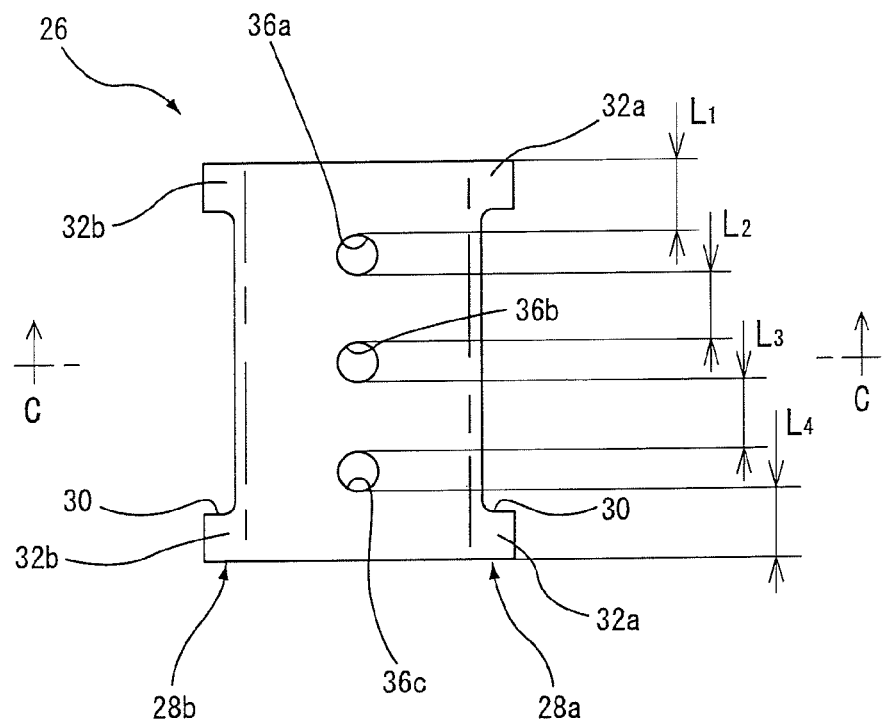
FIG. 5 is a plan explanation view of the partition member to be embedded into the bushing body of the stabilizer bushing shown in FIG. 1.
Figure 6:
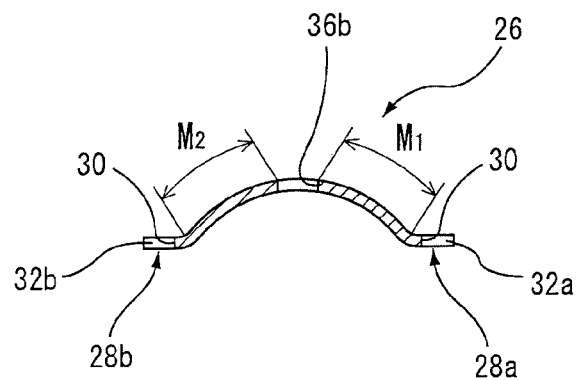
FIG. 6 is a cross sectional explanation view taken along the line C-C in FIG. 5.

More specifically described, the partition members 26 is each composed of a divided tubular metal fitting having an arc shaped cross section shorter than a semi-circle, which is taken along the line perpendicular to the axis, as shown in FIG. 5 and FIG. 6. Further, the partition member 26 has a thickness that is sufficiently smaller than the bushing body 16 (see FIG. 1). Further, the length in the axial direction (extending direction) of the partition member 26 is longer than the length in the axial direction (length between end surfaces in the axial direction) of the bushing body 16 and shorter than the length between end surfaces of the rubber protrusions 22, 22 vertically provided on both end surfaces of the busing body 16 (see FIG. 2 and FIG. 4). Furthermore, the inner diameter of the partition member 26 is made a little bit larger than the inner diameter of the bushing body 16 having a tubular shape, and the outer diameter of the partition member 26 is made sufficiently smaller than the diameter of the lower portion of the bushing body 16, which has a semi-cylindrical shape. The difference between the inner diameter of the partition member 26 and the inner diameter of the bushing body 16 is made sufficiently smaller than the difference between the outer diameter of the partition member 26 and the diameter of the lower portion of the bushing body 16 (see FIG. 1 and FIG. 2).

At both end portions of the partition member 26 in the circumferential direction, bend portions 28a, 28b that are obtained by bending the end portions of the partition member 26 are each integrally formed. Each of the bend portions 28a, 28b protrudes radially outwardly from the both end portions in the circumferential direction of the partition member 26 with a predetermined height and has a plate shape continuously extending in the axial direction. At the middle area in the extending direction of each of the bend portions 28a, 28b (axial direction of the partition member 26), a notch or cut-out 30 having a rectangular shape is formed. Accordingly, the end portions at the both ends in the extending direction of the bend portions 28a, 28b are each made to be wider than the middle area in the extending direction. The end portions at the both ends in the extending direction of the bend portions 28a, 28b each having a larger width are made as outer flanges 32a, 32a, 32b, 32b extending in a radially outward direction from the both circumferential ends located at the axial end portions of the partition member 26.

The partition member 26 includes three through holes 36a, 36b, 36c that penetrate through the partition member 26 in the thickness direction thereof. Each of the three through holes 36a, 36b, 36c has a circular shape and a size that is sufficient for the unvulcanized rubber to pass through at the time of bonding of the partition member 26 to the bushing body 16 by vulcanization, i.e., at the time of the integral vulcanization molding of the bushing body 16 and the partition member 26. The specific size (opening area, inner diameter, and the like) of each of the through holes 36a, 36b, 36c are suitably determined depending on the size of the whole bushing body 16, the number of the through holes 36 formed in the partition member 26, the thickness of the inner rubber portion (38) which will be described later, or the like.

In the present embodiment, especially, the through holes 36a, 36b, 36c are only located at the positions each equally dividing the partition member 26 into four sections in the axial direction at the center portion in the circumferential direction of the partition member 26.

Specifically, as shown in FIG. 5, $L_1$, $L_2$, $L_3$, and $L_4$ are made to be the same length. Specifically, $L_1$ is the axial length (distance) between the edge of the partition member 26 at one side in the axial direction (upper side in FIG. 5) and the inner circumferential surface of the through hole 36a that is closest to the edge of the partition member, $L_2$ is the axial length (distance) between the inner circumferential surfaces of the two through holes 36a and 36b adjacent to each other at the one side in the axial direction, $L_3$ is the axial length (distance) between the inner circumferential surfaces of the two through holes 36b and 36c adjacent to each other at the other side in the axial direction (lower side in FIG. 5), and $L_4$ is the axial direction (distance) between the edge of the partition member 26 at the other side in the axial direction and the inner circumferential surface of the through hole 36c that is closest to the edge of the partition member.

Further, as shown in FIG. 6, the length $M_1$: between the edge at one side in the circumferential direction (right side in FIG. 6) of the partition member 26 and the inner circumferential surface of the through hole 36b and the length $M_2$: between edge at the other side in the circumferential direction (left side in FIG. 6) of the partition member and the inner circumferential surface of the through hole 36b are made to be the same. Further, as apparent from FIG. 5, the length between the either edge in the circumferential direction of the partition member 26 and the inner circumferential surface of each of the other two through holes 36a and 36c is also made to be the same.

All of the distances $L_2$ and $L_3$: between the through holes 36a, 36b and 36c in the axial direction, and the distances $L_1$ and $L_4$: between the edges in the axial direction of the partition member 26 and the respective through holes 36a and 36c, which are positioned closest to either of the edges, are not necessarily the same. Even if one or more of the distances in the axial direction is different from the other(s), it is acceptable as long as the difference is considered to be small. Further, the circumferential distances $M_1$, $M_2$: between the either edge in the circumferential direction of the partition member 26 and each of the through holes 36a, 36b, 36c are not necessarily the same. Even if one or more of the distances in the circumferential direction is different from the other(s), it is acceptable as long as the difference is considered to be small.

As shown in FIG. 1 and FIG. 2, the two partition members 26, 26 having the above structure are embedded in the radially middle area of the bushing body 16 at the corresponding positions in the vertical direction such that the inner bore 18 is positioned between the partition members 26 and 26 in a state where the inner circumferential surfaces of each of the partition members 26, 26 face the inner side. In other words, the two partition members 26, 26 are embedded in the bushing body 16 such that they constitute a tubular metal fitting extending coaxially with the inner bore 18. As a result, by the two partition members 26, 26, the bushing body 16 is divided into the inner rubber portion 38 that is positioned at the inner side of the partition members 26, 26 and the outer rubber portion 40 that is positioned at the outer side of the partition members 26, 26. Then, each of the partition members 26, 26 are bonded to the inner rubber portion 38 by vulcanization at the inner circumferential surface thereof and bonded to the outer rubber portion 40 by vulcanization at the outer circumferential surface thereof.

As described above, the difference between the inner diameter of each of the partition members 26, 26 and the inner diameter of the bushing body 16 is made sufficiently smaller than the difference between the outer diameter of each of the partition members 26, 26 and the diameter of the lower portion of the bushing body 16. By this arrangement, the thickness of the inner rubber portion 38 is made sufficiently smaller than that of the outer rubber portion 40.

Especially, in the present embodiment, the thickness of the inner rubber portion 38 is set at extremely thin thickness so that the inner rubber portion 38 is not subjected to an elastic deformation at the time of application of the load in the direction perpendicular to the axis of the bushing body 16 while the stabilizer bushing 10 is mounted on the automobile.

Specifically, as will be described later, in a state where the stabilizer bushing 10 is mounted to the body 14 of the automobile with the stabilizer bar 12 inserted into the inner bore 18 of the bushing body 16, a predetermined load is applied to the inner rubber portion 38 when the stabilizer bar 12 is relatively displaced against the bushing body 16 in the direction perpendicular to the axis (the thickness direction of the inner rubber portion 38 or the outer rubber portion 40). At that time, the inner rubber portion 38 is not subjected to elastic deformation in the thickness direction (the direction perpendicular to the axis) because the thickness thereof is sufficiently small.

The thickness of the inner rubber portion 38 is not particularly limited. The thickness is suitably determined depending on the whole size of the bushing body 16 or the amount of load applied to the bushing body 16 while the stabilizer bushing 10 is mounted on the automobile, for example. Preferably, the thickness of the inner rubber portion 38 is determined such that the maximum thickness of the inner rubber portion 38 (dimension indicated by $T_1$ in FIG. 1) is to be smaller than the half of the maximum thickness of the outer rubber portion 40 (the maximum thickness measured in the radial direction of the inner bore, which is the dimension indicated by $T_2$ in FIG. 1), i.e., such that the formula: $T_1 < T_2/2$ is satisfied. By this arrangement, when the load is applied to the bushing body 16 in the direction perpendicular to the axis, the outer rubber portion 40 is inevitably elastically-deformed in the thickness direction, so that more effective damping characteristics can be exhibited by the outer rubber portion 40, and the inner rubber portion 38 is not subjected to an elastic deformation in the thickness direction or the elastic deformation can effectively be suppressed. Then, as will be described later, a liner cloth 42 is fixed to the inner circumferential surface of the inner rubber portion 38 by an anchor effect exhibited by a rubber material of the inner rubber portion 38, for example. Thus, the inner rubber portion 38 should at least have a thickness that allows the liner cloth 42 to be mounted. In view of this, it is preferable that the inner rubber portion 38 have a thickness of at least 1 mm.

In the present invention, the two partition members 26, 26 are embedded in the above-described bushing body 16 such that one of the two partition members 26, 26 is arranged in such a way that the three through holes 36a, 36b, 36c thereof correspond to the center portion in the circumferential direction of the lower surface which is the semi-cylindrical surface of the bushing body 16, in the height direction of the bushing body 16. The other partition member 26 is arranged in such a way that the three through holes 36a, 36b, 36c thereof correspond to the center portion in the width direction of the upper surface of the bushing body 16, which is a flat surface having a rectangular shape, in the height direction of the bushing body 16.

Further, the bend portions 28a, 28b integrally formed at both end portions of each of the partition members 26, 26 in the circumferential direction are arranged so as to oppose to each other with the middle part in the height direction of the bushing body 16 disposed therebetween. Then, the split 24 is provided at the middle part in the height direction of the bushing body 16 (which includes a part of the inner rubber portion 38 and a part of the outer rubber 40 portion), which is positioned between the bend portion 28b of one of the partition members 26, 26 and the bend portion 28b of the other partition member 26 that are arranged so as to oppose to each other. Thus, the bushing body 16 can smoothly be opened at the split 24 without interference from the two partition members 26, 26 embedded in the bushing body 16.

Here, the transverse cross-sectional shape (cross-sectional shape that is taken along a plane perpendicular to the axis) of each of the partition members 26, 26 is an arc shape that is shorter than the semi-circle, so that the length of each of the partition members 26, 26 in the circumferential direction is made short. As a result, the distance between the bend portions 28a and 28a and the distance between the bend portions 28b and 28b of the corresponding partition members 26, 26 are made relatively large, so that the volumes of the middle part in the height direction of the bushing body 16, which are positioned between the bend portions 28a and 28a and between the bend portions 28b and 28b, are made sufficiently large. Consequently, the split 24 can easily be formed on the middle part in the height direction of the bushing body 16. Further, the middle part in the height direction of the bushing body 16 that is positioned opposite to the formation position of the split 24 can surely be functioned as a hinge.

As shown in FIG. 3 and FIG. 4, in a state where the two partition members 26, 26 are embedded in the bushing body 16, each end portion in the axial direction of each of the partition members 26, 26 protrudes from each end surface in the axial direction of the bushing body 16 and a base portion of each of the outer flanges 32a, 32a, 32b, 32b are embedded in the rubber protrusions 22, 22. Then, of leading end portions of each of the outer flanges 32a, 32a, 32b, 32b, corner portions positioned at an outer side in the axial direction of the bushing body 16 protrude in the radially outward direction of the bushing body 16 from the rubber protrusions 22, 22 such that only the corner portions are exposed to the outside from both the axial end surfaces of the bushing body 16. Consequently, here, the corner portions of each of the outer flanges 32a, 32a, 32b, 32b exposed from the axial end surface of the bushing body 16 are made as exposed portions 34a, 34a, 34b, 34b. Then, the exposed portions 34a, 34a, 34b, 34b are adapted to be supported by an insert or the like in order to place each of the partition members 26, 26 in a predetermined position in the integral vulcanization molding of the bushing body 16 and each of the partition members 26, 26, which will be described later. As apparent from this, in the present embodiment, projections that are provided at both axial end portions of the partition members are constituted by the axial end portions of the partition members 26, 26 and the outer flanges 32a, 32a, 32b, 32b. The exposed portions 34a, 34a, 34b, 34b may be constituted not only by the corner portions of the outer flanges 32a, 32a, 32b, 32b, but also by the entire of the outer flanges 32a, 32a, 32b, 32b.

Further, as shown in FIG. 1 and FIG. 2, the liner cloth 42 is fixed to the inner circumferential surface of the inner rubber portion 38 of the bushing body 16. The liner cloth 42 has a thin cylindrical shape having an outer diameter corresponding to the inner diameter of the inner rubber portion 38 and an axial length that is the same as the distance between the end surfaces of the rubber protrusions 22, 22, each of which has an annular disk shape and is integrally formed on the both axial end surfaces of the bushing body 16. Further, the liner cloth 42 covers the entire length of the inner circumferential surface of the inner rubber portion 38 and the entire of the inner circumferential surface of the rubber protrusion 22. As a result, the entire inner circumferential surface of the inner rubber portion 38 is provided with sufficient sliding properties. Thus, the stabilizer bar 12 can be relatively rotated against the inner rubber portion 38 of the bushing body 16, with the stabilizer bar 12 inserted into the inner bore 18 of the bushing body 16.

The kinds of the liner cloth 42 are not limited as long as it has a surface lubricity. Examples of the liner cloth 42 include a fluororesin fiber cloth, such as Teflon (registered trademark) cloth that is mainly composed of fluororesin (PTFE) fiber, and a knitted fabric made of polyamide fiber.

The bushing body 16 having the above structure is mounted to the body 14 of the automobile by means of the bracket 44. Specifically, the flat upper surface of the bushing body 16 into which the stabilizer bar 12 is inserted is contacted with an attachment surface of the body 14. Further, in a state where the middle area in the axial direction of the bushing body 16 is encircled by an encircling portion 46 of the bracket 44, two attachment portions 48, 48 extending from ends in the circumferential direction of the encircling portion 46 are fixed at the body 14 by bolts. In this way, the stabilizer bushing 10 is mounted to the body 14. Thus, the stabilizer bar 12 is supported on the body 14 in a vibration damping fashion while extending in the horizontal direction by means of the stabilizer bushing 10. Then, the vibration load caused by the relative displacement between the stabilizer bar 12 and the bushing body 16 in the vertical direction or the horizontal direction can effectively be absorbed based on the elastic deformation of the outer rubber portion 40 of the bushing body 16.

Further, as shown in FIG. 2, in a state where the stabilizer bushing 10 is mounted to the body 14, an axial end surface of the rubber protrusion 22 integrally formed on one end surface of the bushing body 16 is arranged so as to oppose to the end surface of a stopper 49 having a ring shape, which is outwardly fixed on the stabilizer bar 12 with a small distance therebetween.

As described above, each of the rubber protrusions 22, 22 is protruded in the axially outward direction from both axial end surfaces of the bushing body 16 with a higher height than the protruded heights of the both axial end portions of the partition members 26, 26 and both outer flange portions 32a, 32b. Thus, the rubber protrusions 22, 22 cover the outer flange portions 32a, 32b except for the exposed portions 34a, 34b thereof and both of the axial end portions of the partition members 26, 26. Then, at a relative displacement of the stabilizer bar 12 in one of the axial direction of the bushing body 16, the rubber protrusion 22 positioned at one axial direction is abutted to the stopper 49 prior to the exposed portions 34a, 34b of the outer flange portions 32a, 32b. By this arrangement, the rubber protrusion 22 is advantageously functioned as a cushion rubber that prevents the axial end portions of the partition members 26, 26 and the outer flanges 32a, 32b from contacting or being subjected to the abutting contact with the stopper 49. Here, the stabilizer bar 12 is bent at the portion from which it extends to the other side in the axial direction of the bushing body 16, thereby preventing the relative displacement of the stabilizer bar 12 to the other side in the axial direction of the bushing body 16. Therefore, the stopper 49 is not provided at the other side in the axial direction of the stabilizer bar 12 (left side in FIG. 2).

The bushing body 16 constituting the stabilizer bushing 10 of the present embodiment is produced by an insert molding in which the injection molding is performed by using the two partition members 26, 26 and the liner cloth 42 as inserts.

Figure 7:
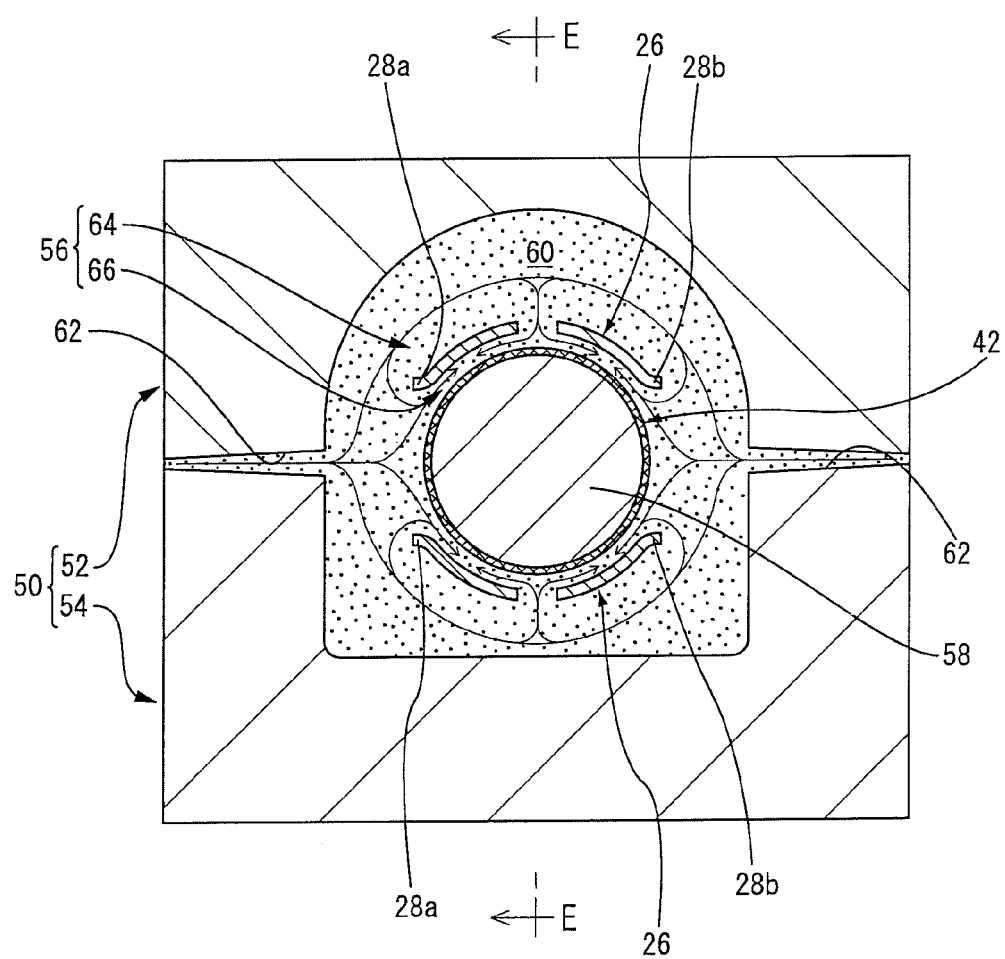
FIG. 7 is an explanation view showing a state where the bushing body shown in FIG. 3 is subjected to an integral vulcanization molding together with the partition members, and the sliding member is fixed to the bushing body.
Figure 8:
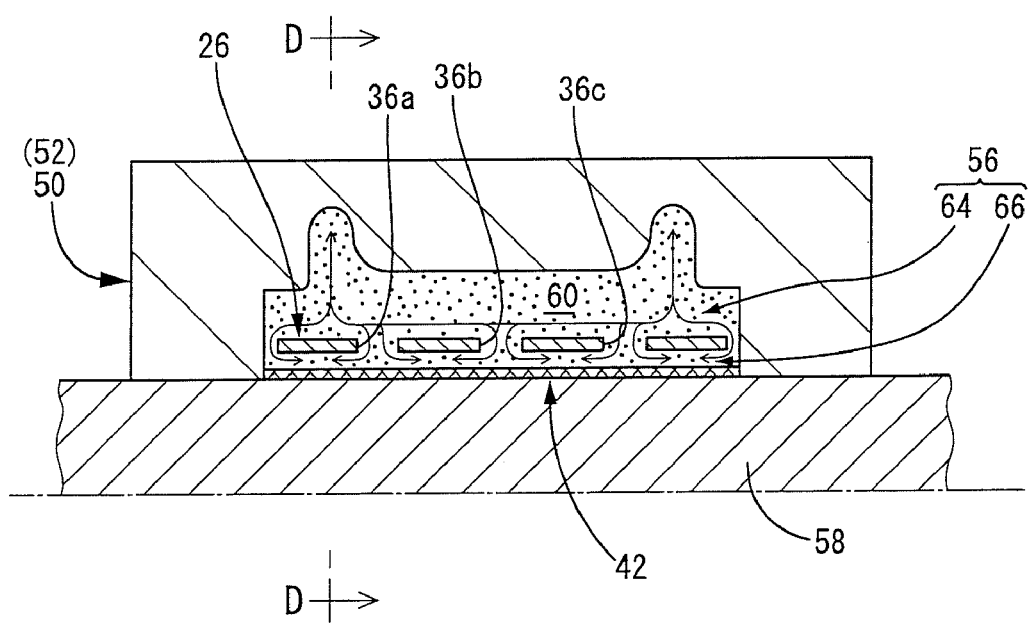
FIG. 8 is an enlarged cross sectional explanation view of the main part taken along the line E-E in FIG. 7.

More specifically described, as shown in FIG. 7 and FIG. 8, in the production of the bushing body 16, a die for injection molding 50 having a known structure is used. The die for injection molding 50 includes an upper die 52 and a lower die 54. When the upper die 52 and the lower die 54 are clamped together, a mold cavity 56 having a shape corresponding to an outer shape of the bushing body 16 is formed between inner surfaces of the upper die 52 and the lower die 54.

In the production of the bushing body 16 by using such a die for injection molding 50, first, the mold cavity 56 having a shape corresponding to an outer shape of the bushing body 16 is formed by clamping of the upper die 52 and the lower die 54, and the liner cloth 42 is disposed in the center portion of the mold cavity 56 with the liner cloth 42 disposed outwardly of a center die 58. Then, the two partition members 26, 26 are set at both sides in the radial direction of an insert die (not shown) such that the corresponding bend portions 28*a*, 28*b* are opposed to each other with the liner cloth 42 disposed therebetween. At this time, the exposed portions 34*a*, 34*a*, 34*b*, 34*b* of the outer flange portions 32*a*, 32*a*, 32*b*, 32*b* of the bend portions 28*a*, 28*b* are secured by the insert die, so that the positions of the two partition members 26, 26 are determined. Subsequently, unvulcanized rubber 60 injected from an injection molding machine, which is not shown, is introduced into the mold cavity 56 through a sprue 62 of the lower die 54 to fill the mold cavity 56. Then, the unvulcanized rubber 60 in the mold cavity 56 is solidified.

By the above process, the outer rubber portion 40 is formed by vulcanization in an outer cavity section 64 consisting of a part of the mold cavity 56 positioned outer side of each of the partition members 26, 26. At the same time, the inner rubber portion 38 is formed by vulcanization in an inner cavity section 66 consisting of a part of the mold cavity 56 positioned between each of the partition members 26, 26 and the liner cloth 42. In addition, at the same time, the two partition members 26, 26 are bonded to the inner circumferential surface of the outer rubber portion 40 and the outer circumferential surface of the inner rubber portion 38 by vulcanization, and the liner cloth 42 is fixed to the inner circumferential surface of the inner rubber portion 38. Here, the inner rubber portion 38 has a thickness that allows the liner cloth 42 to be fixed thereto but that cannot be subjected to the elastic deformation in the thickness direction. Therefore, the bushing body 16 having a structure shown in FIG. 3 and FIG. 4 is integrally formed by vulcanization together with the two partition members 26, 26. Concurrently with this, the liner cloth 42 is fixed to the bushing body 16.

In the formation process of the bushing body 16 by the integral vulcanization, the unvulcanized rubber 60 flow from the outer cavity section 64 into the inner cavity section 66. At this time, as indicated by the arrows in FIG. 7 and FIG. 8, a part of the unvulcanized rubber 60 flow into the inner cavity section 66 after flowing to lateral sides of the bend portions 28*a*, 28*b* of each of the partition members 26, 26. Concurrently with this, another part of the unvulcanized rubber 60 flow into the inner cavity section 66 through each of the through holes 36*a*, 36*b*, 36*c* provided in the two partition members 26, 26. Further, still another part of the unvulcanized rubber 60 flows into the inner cavity section 66 after flowing to the edge portions in the axial direction of each of the partition members 26, 26.

As a result, in the integral vulcanization molding process of the bushing body 16, the flow distance of the unvulcanized rubber 60 in the inner cavity section 66 is advantageously made small compared to the case where the partition members having no through holes 36*a*, 36*b*, 36*c* are used and all of the unvulcanized rubber 60 flow into the inner cavity section after flowing to edge portions in the circumferential direction or edge portions in the axial direction. As a result, the pressure applied to the liner cloth 42 based on the flow pressure of the unvulcanized rubber 60 flowing in the inner cavity section 66 can advantageously be reduced.

Further, the through holes 36*a*, 36*b*, 36*c* are located at positions that equally divide the partition member 26 into a plurality of sections in the axial direction and the circumferential direction. Therefore, in the circumferential direction in the inner cavity section 66, the flow distance of the unvulcanized rubber 60, which is flowed into the inner cavity section 66 after flowing to the lateral side of the both bend portions 28*a*, 28*b* of the partition member 26, and the flow distance of the unvulcanized rubber 60, which is flowed into the cavity section 66 through each of the through holes 36*a*, 36*b*, 36*c* of the partition member 26, are the same. Further, in the axial direction in the inner cavity section 66, the flow distance of the unvulcanized rubber 60, which is flowed into the inner cavity section 66 after flowing to the axial edge portion of the partition member 26, and the flow distance of the unvulcanized rubber 60, which is flowed into the inner cavity section 66 through each of the through holes 36*a*, 36*b*, 36*c* of the partition member 26, are the same. As a result, the pressure applied to the liner cloth 42 based on the flow pressure of the unvulcanized rubber 60 flowing in the inner cavity section 66 can be equalized in the circumferential direction and the axial direction of the liner cloth 42.

Thus, in the integral formation process of the bushing body 16 by vulcanization, it can advantageously be prevented that the inner cavity section 66 is not sufficiently filled with the unvulcanized rubber 60, although the width of the inner mold cavity 66 is small. Further, it can also effectively be prevented that the liner cloth 42 is fixed to the inner rubber portion 38 while the liner cloth 42 is partially undulated or rumpled by the flow pressure of the unvulcanized rubber 60. In addition, it can be prevented that a part of the unvulcanized rubber 60 oozes from the inner circumferential surface of the liner cloth 42 and the inner circumferential surface of the liner cloth 42 is partially covered by the rubber.

As described above, each of the through holes 36*a*, 36*b*, 36*c* located in each of the partition members 26, 26 are used as a flow pass of the unvulcanized rubber 60 in the production of the bushing body 16, so that, in the stabilizer bushing 10 of the present embodiment, the liner cloth 42 can have a perfect circle in a transverse cross section which is not undulated or rumpled and can be fixed to the inner circumferential surface of the inner rubber portion 38 without partly having a rubber film or the like formed on the inner side thereof. Thus, in the stabilizer bushing 10, with the stabilizer bar 12 inserted into the inner bore 18 and mounted to the body 14, the variation in the sliding properties against the stabilizer bar 12 that is caused by the undulation and rumples of the liner cloth 42 or the rubber film partly formed on the inner circumferential surface of the liner cloth 42, for example, can advantageously be prevented. As a result, the smooth rotation in the torsional direction of the stabilizer bar can always stably be secured.

In addition, in the present embodiment, the inner rubber portion 38 of the bushing body 16 has the thickness that is not substantially elastically deformed in the thickness direction. Thus, when the stabilizer bar 12 is relatively displaced in the vertical direction and the vertical load is applied to the bushing body 16, in a state where the stabilizer bushing 10 is mounted to the body 14, it can advantageously be prevented that the liner cloth 42 is undulated or rumpled due to the elastic deformation of the inner rubber portion 38 in the thickness direction. By this arrangement, the smooth rotation in the torsional direction of the stabilizer bar 12 based on the excellent sliding properties of the liner cloth 42 can always stably be secured, too.

Accordingly, in the stabilizer bushing 10 of the present embodiment, the thickness of the inner rubber portion 38 is made equal in the circumferential direction, thereby stably securing excellent damping characteristics and the adhesion of the liner cloth 42 to the inner rubber portion 38. In addition, the torsional friction between the inner circumferential surface of the bushing body 16 and the outer circumferential surface of the stabilizer bar 12 can effectively and stably be reduced. As a result, the noise caused by the rotation of the stabilizer bar 12 in the torsional direction can effectively be prevented, thereby advantageously ensuring driving comfort of the automobile.

Further, in the stabilizer bushing 10, the two partition members 26, 26 are embedded in the bushing body 16 such that the inner rubber portion 38 is not substantially elastically deformed by the load applied in the vertical direction. Therefore, hysteresis in load-deflection properties of the spring of the bushing body 16 as a whole can effectively be lowered or made small. Further, the steering stability of the automobile on which the stabilizer bushing 10 is mounted can effectively be improved.

In the stabilizer bushing 10 of this embodiment, the rubber portion 22 that is integrally formed on one axial end surface of the bushing body 16 is allowed to be functioned as a cushion rubber that prevents the axial end portion of the partition members 26, 26, which is protruded from the axial end surface of the bushing body 16, and the outer flanges 32a, 32a, 32b, 32b of the respective bend portions 28a, 28b from contacting or abutting contacting with the stopper 49 that is outwardly fixed on the stabilizer bar 12. As a result, it can effectively be prevented that noise is generated by the contact or collision of the axial end portions of each of the partition members 26, 26 and the outer flanges 32a, 32a, 32b, 32b with the stopper 49, which is outwardly fixed on the stabilizer bar 12.

Further, in the stabilizer bushing 10, the through holes 36a, 36b, 36c are only formed in the center portion in the circumferential direction of the partition member 26 so as to be aligned in the axial direction with the equal distance therebetween. Therefore, compared to the case where the through holes 36a, 36b, 36c that are formed in the axial direction with the equal distance therebetween are further formed at a plurality of positions with the equal distance therebetween in the circumferential direction of the partition member 26, for example, the strength of the partition member 26 of the present embodiment can more stably and advantageously be secured, because there are fewer through holes 36a, 36b, 36c.

In the present embodiment, the outer flanges 32a, 32a, 32b, 32b consisting of both axial end portions of the bend portions 28a, 28b that extends radially outwardly of the partition member 26 are formed as portions that are secured by the insert die and the like in order to secure the partition member 26 at a predetermined position in the mold cavity 56 at the time of formation of the bushing body 16 by vulcanization. Therefore, compared to the case where a partition member made of a divided tubular metal fittings having no outer flange is set in an insert die or the like in the formation of the bushing body 16 by vulcanization, the partition member 26 of the present embodiment can more easily and stably be secured at a predetermined position in the mold cavity 56.

While the specific embodiment of the present invention has been described in detail, for illustrative purpose only, it is to be understood that the present invention is not limited to the details of the illustrated embodiments.

Figure 9:
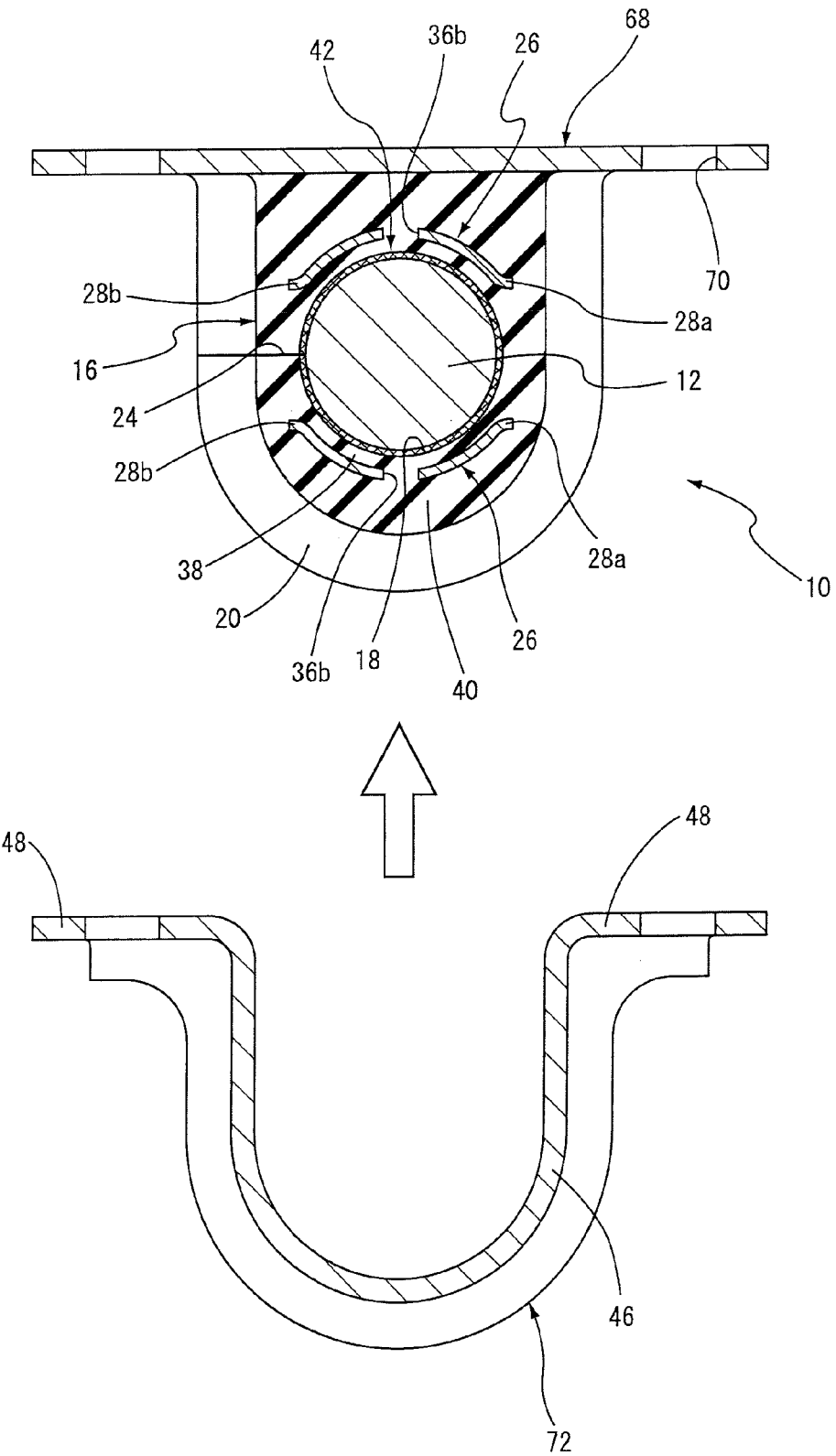
FIG. 9 is a cross sectional explanation view taken along the line perpendicular to the axis, showing another embodiment of the stabilizer bushing having a structure of the present invention.

For example, as shown in FIG. 9, an upper bracket 68 made of a flat metal fitting may be bonded to a flat upper surface of the bushing body 16 by vulcanization. In this case, the attachment portion 48 of a lower bracket 72 can be fixed on the body 14 by a bolt in a state where the upper bracket is temporary fixed at a predetermined position of the body 14 or in a state where a bolt hole 70 of the upper bracket 68 is positioned at an attachment hole (not shown) of the body 14, while the axial middle area of the bushing body 16 is encircled by the encircling portion 46 of the lower bracket 72. Consequently, the bushing body 16, eventually the stabilizer bushing 10 can easily be mounted on the body 14. With respect to FIG. 9, and FIG. 10 to FIG. 12, which will be described later, the same reference numerals as used in FIG. 1 and FIG. 2 are used for members and portions having the same structures as those of the above-described first embodiment, and a detailed explanation of which is dispensed with.

The bushing body can be constituted by two divided bodies. Specifically, the bushing body may be constituted by a tubular elastic body formed by integrating two divided elastic bodies each having a semi-tubular shape and divided surface extending in the axial direction.

Figure 10:
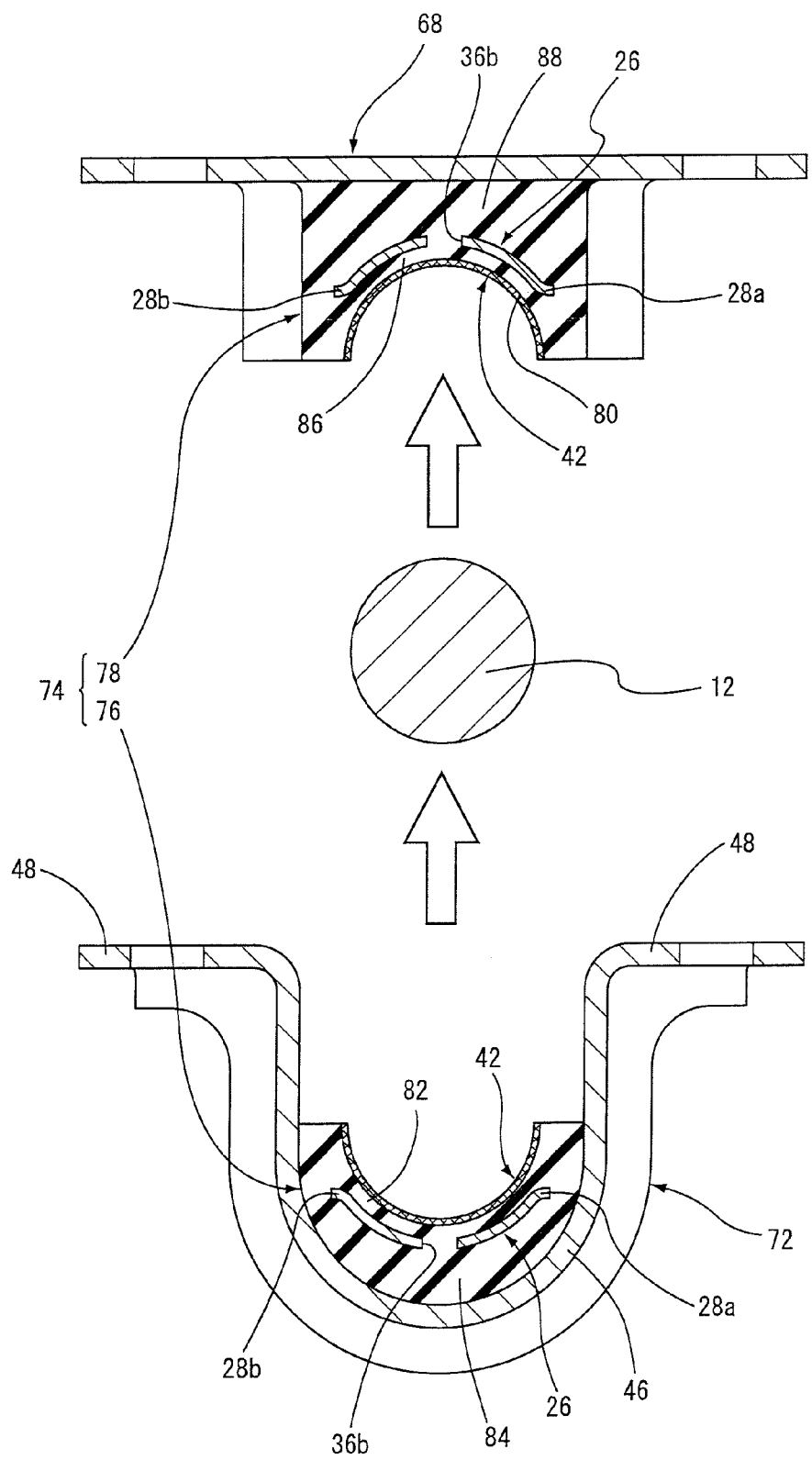
FIG. 10 is a view showing further another embodiment of the stabilizer bushing having a structure of the present invention, and corresponds to FIG. 9.

For example, as shown in FIG. 10, a bushing body 74 consists of a first divided rubber portion 76 that is a lower half of the bushing body 16 of the first embodiment and a second divided rubber portion 78 that is an upper half of the bushing body 16. In other words, the bushing body 74 has a divided structure including the first divided rubber portion 76, which is composed of an elastic body having a substantially semi-tubular shape, and the second divided rubber portion 78, which is composed of a block having a longitudinal square shape and includes a hollow portion 80 at its lower surface that has semi-circular shape and extends in the axial direction.

The stabilizer bushing 10 including the bushing body 74 having such a divided structure includes the partition member 26 that is embedded and bonded by vulcanization in the middle area in the axial direction of the first divided rubber portion 76. In addition, the liner cloth 42 is fixed to the inner circumferential surface of the first divided rubber portion 76. Further, in the middle area in the axial direction of the second divided rubber portion 78, the partition member 26 is embedded and bonded by vulcanization. In addition, the liner cloth 42 having a semi-cylindrical shape is fixed to the inner circumferential surface of the hollow portion 80. Then, a rubber portion positioned at the inner circumferential side of the partition member 26 of the first divided rubber portion 76 is named as a first divided inner rubber portion 82 and a rubber portion positioned at the outer circumferential side of the partition member 26 is named as a first divided outer rubber portion 84. Further, a rubber portion positioned at the inner circumferential side of the partition member 26 of the second divided rubber portion 78 is named as a second divided inner rubber portion 86 and a rubber portion positioned at the outer circumferential side of the partition member 26 is named as a second divided outer rubber portion 88. Further, to the outer circumferential surface of the middle area in the axial direction of the first divided rubber portion 76, the lower bracket 72 (having the same structure as that of the second embodiment) is bonded by vulcanization, with the middle area in the axial direction of the first divided rubber portion 76 encircled by the encircling portion 46. To an upper surface of the second divided rubber portion 78, the upper bracket 68 (having the same structure as that of the second embodiment) is bonded by vulcanization.

The above described stabilizer bushing 10 is mounted on the body 14 by means of the upper bracket 68 and the lower bracket 72 in a state where the first divided rubber portion 76 and the second divided rubber portion 78 are assembled to the stabilizer bar 12 with the stabilizer bar 12 provided therebetween in such a way that the outer circumferential surface of the stabilizer bar 12 is allowed to be contacted and slide on the inner circumferential surface of each of the liner cloth 42, 42.

In the stabilizer bushing 10 of the present embodiment having the above structure, each of the inner rubber portions 38 composed of the first divided inner rubber portion 82 and the second divided inner rubber portion 86, and the partition members 26, 26 embedded in the bushing body 74, has the same structure as that of the first embodiment. Therefore, in this embodiment, the same effect as obtained in the first embodiment can extremely effectively be obtained.

In the stabilizer bushing 10 of this embodiment, the encircling portion 46 is bonded to the first divided outer rubber portion 84 by vulcanization, with the first divided outer rubber portion 84 of the first divided rubber portion 76 encircled by the encircling portion 46 of the rigid lower bracket 72 made of metal. Thus, the rigidity of the first divided outer rubber portion 84 is advantageously improved, thereby effectively exhibiting excellent spring characteristic at the first divided outer rubber portion 84. As a result, the damping characteristic can more effectively be improved.

Figure 11:
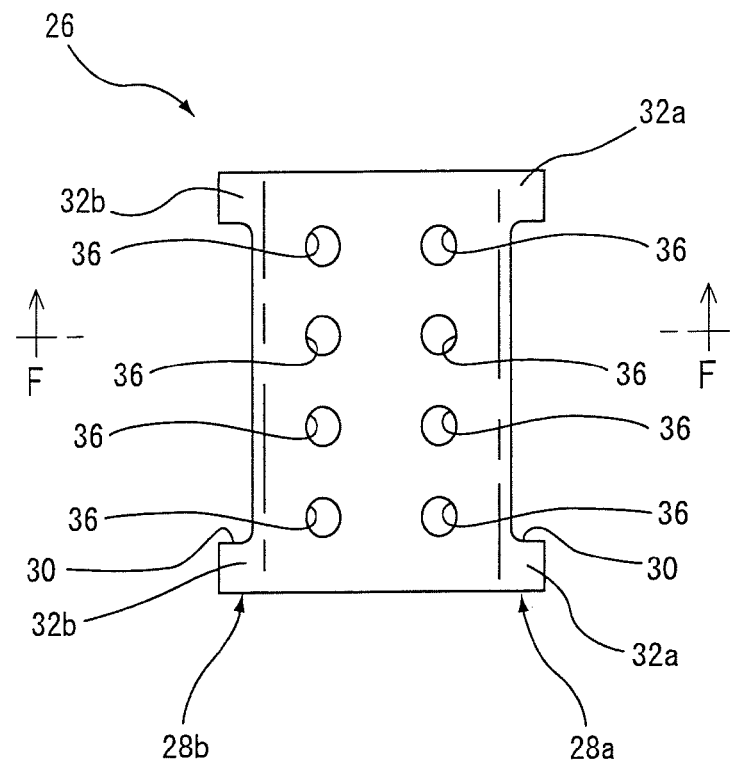
FIG. 11 is a plan explanation view showing another example of the partition member to be embedded in the bushing body of the stabilizer bushing having a structure of the present invention.
Figure 12:
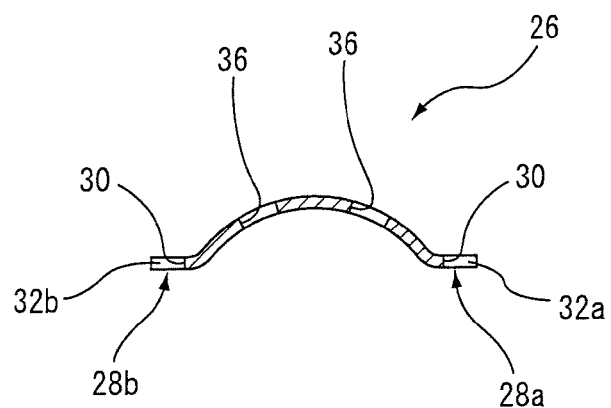
FIG. 12 is a cross sectional explanation view taken along the line F-F in FIG. 11.

The size, shape, specific formation position in the partition member 26 and number of the through holes 36a, 36b, 36c formed in the partition member 26 are not particularly limited as long as each of them has a size that allows the unvulcanized rubber 60 to pass therethrough and is formed at the position that substantially equally divides the partition member 26 into a plurality of sections in the circumferential direction and the axial direction. Therefore, as shown in FIGS. 11 and 12, the through holes 36 may be formed in the positions that substantially divide the partition member 26 into three sections in the circumferential direction and into at least two (here, five) sections in the axial direction.

The rubber protrusion 22, which is integrally formed on the axial end surface of the bushing body 16, is not essential in the present invention. However, in the case where the stabilizer bar 16 is displaceable in the axial direction against the bushing body 16, it is preferable that the rubber protrusion 22 is at least integrally formed on the end surface that is contacted with the stopper 49 by the displacement of the stabilizer bar 12 in the axial direction. Further, the formation position of the rubber protrusion 22 on the axial end surface of the bushing body 16 is not particularly limited to the exemplified position. For example, the rubber protrusion 22 may be formed on the circumference of the opening of the inner bore 18 discontinuously or on one position of the circumference, or may be formed on the position except for the opening of the inner bore 18. Any shapes of the rubber protrusion 22 other than the annular plate shape may suitably be employed.

The liner cloth 42 may be bonded to the inner circumferential surface of the inner rubber portion 38, the first divided inner rubber portion 82, and the second divided inner rubber portion 86, by vulcanization.

The sliding member is not particularly limited to the exemplified one. The sliding member can be composed of a coating layer having lubricity that is formed by burning a well-known lubricant including molybdenum disulfide or fluororesin, for example, into the inner circumferential surface of the inner rubber portion 38, the first divided inner rubber portion 82 or the second divided inner rubber portion 86, by the conventional method.

In the above-described embodiment, the example in which the present invention is applied to the stabilizer bushing for an automobile is described. However, it is to be understood that the present invention can advantageously be applied to any stabilizer bushings for a vehicle other than the automobile.

Although further details will not be described herein, it is to be understood that the present invention may be embodied with various other changes and modifications which may occur to those skilled in the art, without departing from the spirit and scope of the invention.

The invention claimed is:

1. A stabilizer bushing for a vehicle, comprising:
a bushing body made of a tubular elastic body having an inner bore that extends therethrough in an axial direction thereof and respective opposite ridges integrally formed on an outer circumferential surface of respective opposite axial end portions of the bushing body,
wherein a stabilizer bar is inserted into the inner bore without bonding thereto, the bushing body being mounted to a vehicle body by a bracket that is assembled to the outer circumferential surface of the bushing body;
two partition members embedded in a middle area of the bushing body with respect to a radial direction of the bushing body and bonded thereto by vulcanization in such a way that each of the two partition members divides the bushing body into an inner rubber portion and an outer rubber portion, each of the two partition members being rigid and having a semi-tubular shape; and
a sliding member fixed to an inner circumferential surface of the inner bore, the sliding member being slidably contacted with the stabilizer bar inserted into the inner bore,
wherein the inner rubber portion has a thickness that is smaller than a thickness of the outer rubber portion, wherein the inner rubber portion is not elastically-deformed by a load applied thereto,
wherein the two partition members are embedded in the bushing body such that the two partition members correspond to each other in a vertical direction in a state where the stabilizer bar is inserted into the inner bore of the bushing body,
wherein each of the two partition members includes opposite axial end portions that project in an axially outward direction beyond respective opposite axial end surfaces defined by axially outer faces of the respective opposite ridges,
wherein, on at least one longitudinally extending edge of the opposite axial end portions of each of the two partition members, first and second outer flanges which extend in respective opposite radially outward directions of the semi-tubular shape of each of the two partition members, with respect to a cross section taken in a plane perpendicular to a longitudinal axis of the bushing body, are integrally formed with the respective partition members, and
wherein each of the two partition members includes at least one through hole each located such that each of the two partition members is equally divided by a position of each of the at least one through hole in a circumferential direction and an axial direction thereof, the at least one through hole allowing unvulcanized rubber to pass therethrough at the time of injection molding of the elastic body.

2. The stabilizer bushing for a vehicle according to claim 1, wherein a maximum thickness of the inner rubber portion of the bushing body is smaller than half of a maximum thickness of the outer rubber portion.

3. The stabilizer bushing for a vehicle according to claim 1, wherein the sliding member is composed of a liner cloth having a surface lubricity.

4. The stabilizer bushing for a vehicle according to claim 1, wherein the bushing body includes at least one rubber protrusion integrally formed so as to protrude from at least one of the opposite axial end surfaces of the ridges by a distance larger than an axial distance of projection of the opposite axial end portions of the two partition members from the opposite axial end surfaces of the ridges.

5. The stabilizer bushing for a vehicle according to claim 4, wherein each of the outer flanges includes an exposed portion that protrudes in a radially outward direction of the bushing body and is exposed to an outside from a corresponding one of the opposite rubber protrusions of the bushing body.

6. The stabilizer bushing for a vehicle according to claim 1, wherein the at least one through hole comprises a plurality of through holes located only in a center portion in the circumferential direction of each of the two partition members so as to divide the partition member into a plurality of sections in the circumferential direction.

7. The stabilizer bushing for a vehicle according to claim 1, wherein the at least one through hole comprises a plurality of through holes, the plurality of through holes are located only at positions that equally divide each of the two partition members into three sections in the circumferential direction and a plurality of sections in the axial direction.

8. The stabilizer bushing for a vehicle according to claim 1, wherein each of the two partition members has an arc shaped cross section that is taken in the plane perpendicular to the longitudinal axis of the bushing body, and wherein the arc shaped cross section is shorter than a semi-circle.

9. The stabilizer bushing for a vehicle according to claim 1, wherein a part of the outer circumferential surface of the bushing body is made as a flat surface part extending in the axial direction, the flat surface part being positioned at one of an upper side and a lower side in a state where the stabilizer bar is inserted into the inner bore of the bushing body, and the bracket is bonded to the flat surface part by vulcanization.

10. The stabilizer bushing for a vehicle according to claim 1, wherein the bushing body includes a split extending from the outer circumferential surface of the bushing body to the inner bore such that the split extends over the entire length of the bushing body in the axial direction thereof.

11. The stabilizer bushing for a vehicle according to claim 1, wherein the bushing body is constituted by an assembled tubular elastic body that is obtained by integrating two divided elastic bodies each having a semi-tubular shape and including a divided surface extending in the axial direction, and wherein the bracket includes an encircling portion that encircles the entire surface of an outer circumferential surface of one of the two divided elastic bodies except the divided surface, and the bracket is bonded to the one of the two divided elastic bodies by vulcanization in a state where the encircling portion of the bracket encircles the one of the two divided elastic bodies.

12. The stabilizer bushing for a vehicle according to claim 1, wherein the at least one through hole comprises a plurality of through holes which are located such that an axial length of each of the two partition members is equally divided by the positions of the plurality of the through holes in the axial direction.

13. The stabilizer bushing for a vehicle according to claim 1, wherein the integrally formed outer flanges project so as to be oriented in a corresponding plane which is parallel to the longitudinal axis of the bushing body.

* * * * *